United States Patent [19]

Suzuki et al.

[11] Patent Number: 4,540,618
[45] Date of Patent: Sep. 10, 1985

[54] MAGNETIC RECORDING MEDIUM

[75] Inventors: Takashi Suzuki, Takatsuki; Kunio Hibino, Hirakata; Mikio Murai, Kawanishi; Shigeki Kawase, Toyonaka; Koichi Shinohara, Kobe, all of Japan

[73] Assignee: Matsushita Electric Industrial Co., Ltd., Kadoma, Japan

[21] Appl. No.: 521,075

[22] Filed: Aug. 8, 1983

[30] Foreign Application Priority Data

Aug. 12, 1982 [JP] Japan ................. 57-140629
Aug. 31, 1982 [JP] Japan ................. 57-152185
Sep. 14, 1982 [JP] Japan ................. 57-159841
Sep. 14, 1982 [JP] Japan ................. 57-159842
Nov. 18, 1982 [JP] Japan ................. 57-202988

[51] Int. Cl.³ .............................................. B32B 3/00
[52] U.S. Cl. ................................... 428/141; 428/195; 428/201; 428/206; 428/327; 428/693; 428/694; 428/695; 428/900
[58] Field of Search ............... 428/692, 694, 693, 147, 428/201, 206, 219, 327, 900, 695, 195, 141; 427/129, 131, 132

[56] References Cited

U.S. PATENT DOCUMENTS

| 3,959,553 | 5/1976 | Hartmann et al. ............. 427/131 |
| 4,087,582 | 5/1978 | Shirahata et al. ............. 427/132 |
| 4,135,031 | 1/1979 | Akashi et al. ................ 427/131 |
| 4,233,352 | 11/1980 | Ono et al. ................... 428/141 |
| 4,275,113 | 6/1981 | Saito et al. ................. 428/323 |
| 4,320,207 | 3/1982 | Watanabe et al. ............. 525/177 |
| 4,348,446 | 9/1982 | Mitsuishi et al. ............ 428/694 |
| 4,390,601 | 6/1983 | Ono et al. ................... 428/695 |
| 4,439,479 | 3/1984 | Kamai et al. ................ 428/692 |

FOREIGN PATENT DOCUMENTS 2087302 10/1980 United Kingdom .

Primary Examiner—George F. Lesmes
Assistant Examiner—William M. Atkinson
Attorney, Agent, or Firm—Cushman, Darby & Cushman

[57] ABSTRACT

A magnetic recording media, e.g. VTR tape is improved by providing an undercoating layer on a polyester film substrate, the undercoating layer being formed under a ferromagnetic thin film and being an even-scattering of a large number of inorganic or organic granules distributed at a rate of 1000/mm² or more.

15 Claims, 2 Drawing Figures

MAGNETIC RECORDING MEDIUM

BACKGROUND OF THE INVENTION

1. Field of the Invention

The present invention relates to an improvement in magnetic recording medium for video tape recording.

2. Description of the Prior Art

Ferromagnetic thin film type magnetic recording medium manufactured by forming such a ferromagnetic thin film as of Fe, Co, Ni or their alloys on a polyester film, by means of vacuum deposition, ion plating, spattering, or the like method is known. These recording media are advantageous in that their recording density can be drastically increased in comparison with the conventional coated-magnetic-film type recording media. For such high density recording, the pole gap of the magnetic recording head must be made very small and the surface of the magnetic recording medium must be very smooth in order to decrease spacing loss to the utmost extent. However, when the tape surface is too smooth, it has been found that squealing of the tape is induced when running around a recording head drum, and therefore the surface state must be finished with good control. Since the thickness of the ferromagnetic thin film is only 100 Å–5000 Å, the surface condition of the magnetic recording medium is greatly influenced by the surface configuration of the substrate plastic film. Accordingly there have been many proposals to control the surface conditions of the substrate film surfaces. One of the proposals is disclosed in the Japanese Patent unexamined publication No. Sho 53-107314 disclosing that a magnetic recording medium made by forming a ferromagnetic thin film on a substrate polyester film having thermo-plastic minute granular protrusions has satisfactory tape running characteristics and also a good reproduced picture quality. But this conventional magnetic recording medium has a problem that when surface roughness of the ferromagnetic recording medium is made under 300 Å in order to improve the surface smoothness of the magnetic recording medium or attaining a high recording density, stick slips are produced thereby inducing the squealing.

In order to eliminate the squealing of the tape running around the head drum, many proposals have been made, for example, in the Japanese Patent unexamined publications No. Sho 52-18770, No. Sho 52-84264, No. Sho 54-40883, No. Sho 53-116115, No. Sho 53-128685, No. Sho 54-94574, No. Sho 56-10455, No. Sho 56-16937. In these documents, it is proposed that the characteristic of touching the head and running is intended to be improved by evenly forming a relatively finely roughened surface, for instance, wrinkle shape protrusions, minute earth worm shape protrusions or minute granular shape protrusions, to improve running and head cylinder touching characteristics at the same time. The above-mentioned improvements are very effective in improving the characteristics of head touching, squealing and running in normal temperature and normal moisture conditions.

However, when the magnetic recording medium is used in adverse conditions of high moisture and high temperature, that is, 30° C. and 80–90% RH, even the above-mentioned magnetic recording medium of the type proposed is liable to make a squealing noise at the rotary head cylinder part and also the still lives thereof are not sufficiently long. In order to solve the problem, some of the inventors of the present invention proposed in Japanese Patent Application No. Sho 57-128784, filed on July 22, 1982, utilizing polyester film as a substrate and making polyester oligomers included in the polyester substrate film to separate and form minute protrusions on the substrate surface by a thermal treatment at the time or before forming the ferromagnetic metal thin film on the substrate. But in this proposed method, it is an important problem to evenly distribute the oligomer protrusions on the surface by some appropriate measures.

SUMMARY OF THE INVENTION

The present invention purposes to provide improved magnetic recording media having improved characteristics against squealing in high moisture and high temperature use, and in still life, as well as improved envelope characteristics, suitable for high density recording.

DESCRIPTION OF THE PREFERRED EMBODIMENTS

Magnetic recording medium in accordance with the present invention comprises a substrate of plastic film, an undercoating layer having 1000/mm$^2$ or more minute granular protrusions of 30 to 500 Å heights and coating a face of said substrate, a ferromagnetic thin film formed on said undercoating layer, and a lubrication layer formed on said ferromagnetic thin film.

Figure 1:
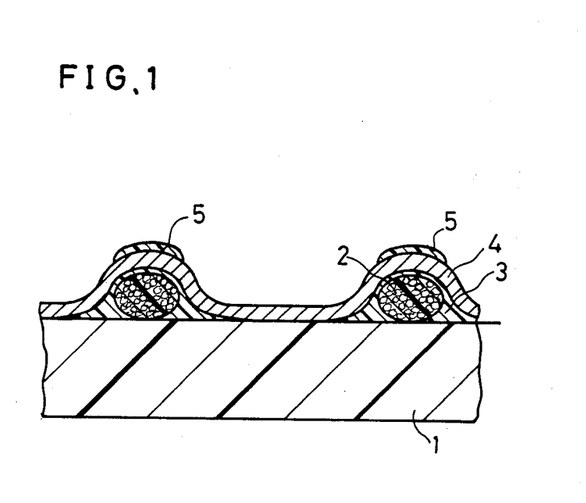
FIG. 1 is a schematic sectional side view of a magnetic recording medium embodying the present invention.
Figure 2:
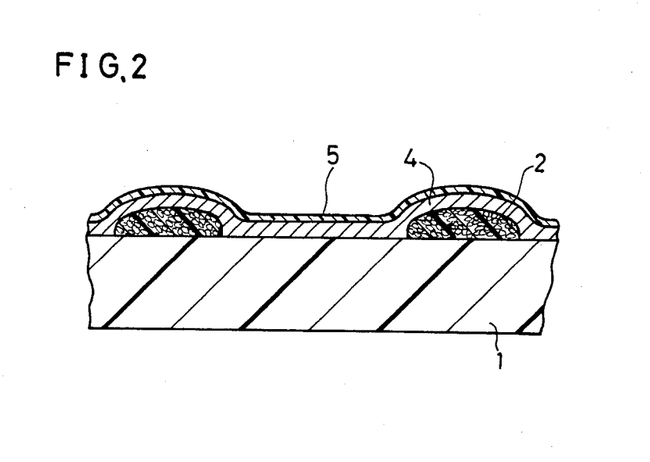
FIG. 2 is a schematic sectional side view of another magnetic recording medium embodying the present invention.

FIG. 1 and FIG. 2 show preferred first embodyment and preferred second embodiments in accordance with the present invention, wherein numeral 1 designates a plastic film substrate having flat surface. On a surface of the plastic film substrate, protrusions of granules 2 are formed with an even distribution. In the example of FIG. 1, a layer of binder is formed to bond granules 2 on the surface of the plastic film substrate 1. A scattering of the granules 2 bonded by the binder layer 3 or directly bonded on the substrate 1 forms the undercoating layer. A ferromagnetic metal thin film 4 is formed on the undercoating layer. The lubrication layer 5 is formed on the ferromagnetic thin film 4. In the example of FIG. 1, the granules 2 and the binder 3 together form granular protrusions. In the example of FIG. 2 a scattering of the granules 2 directly bonded on the surface of the plastic film substrate 1 as such forms the granular protrusions. Both types of undercoating layers are effective in improving the characteristics of the magnetic recording medium. In the example of FIG. 1 the lubrication layer 5 is formed only on limited parts, namely, around top parts of the granular protrusions. In the example of FIG. 2, the lubrication layer 5 is formed all the way over the ferromagnetic thin film 4.

As the plastic film substrate 1, polyester film substrate comprising as the major component, polyethyleneterephthalate (as a single substance), its copolymer, its mixed polymer, polyethylennaphtalate (as a single substance), its copolymer or its mixed polymer, can be used. And also, substrates of polyesterimide, polyimide or the like polyimide plastics, or an aromatic polyamide film substrate can be used. Especially appropriate substrates are those having a very smooth surface. For instance, when the film is the polyester film, those having almost no minute protrusions induced by polymerization residue, or those having the minute protrusions of roughness smaller than several hundreds of Å or those having minute protrusions of evenly distributed earth-worm-shape or granules with surface roughness smaller than several hundreds of Å are preferable.

Heights of the granuler protrusions are measured by using high accuracy contact tip type roughness meter (Talystep-1 of Taylor-Hobson Co., Ltd. USA), and the measured roughness is represented with the value which is level difference from the peak of the protrusion to the bottom of the valley of the surface in a manner as defined by ISO R468-1966 or JIS B0601 Standard. Usable heights of the granular protrusions are in the range of 30–500 Å, and more preferably in the optimum range of 50–300 Å. At less than the height of 30 Å, the effect of preventing the squealing in high moisture, high temperature conditions is insufficient, and over 500 Å heights the envelope is likely to produce disturbance.

For lateral size i.e. spread in the plan view of the granular protrusions, the size should be as large as 1 time–20 times the height of the protrusion, and more preferably, optimum range should be as large as 2 times–10 times of the height. When the lateral size is over 20 times of the height, then the prevention effect of squealing is not sufficient; and when the lateral size is smaller than its protrusion height the protrusions become fragile, and running is not smooth.

For the area density of the granular protrusions on the film surface, 1000/mm$^2$ or more, more preferably 2500/mm$^2$ or more, is appropriate. Under 1000 granular protrusions, prevention of squealing is not sufficient. And, such a density of the granular or more, is appropriate. The density of the granular protrusions can be obtained by observing them through a differential interference type optical microscope of the magnitude of about 400 and observing at least 10 microscopic fields, or by observing them by a scanning type electron microscope of the magnitude of about 3,000 over 10 microscopic fields or more, and counting the number of granular protrusions in the fields, followed by subsequent calculation of the average value of the number of granular protrusions per mm$^2$.

As minute granules, thermo-plastic resin minute granules, cross-linked resin minute granules, minute granules of metal oxide e.g. silica, alumina, titanium oxide, iron oxide, etc., minute granules of carbon, or a hydrolysis product of metal alkoxide, etc. are usable. Among the above-mentioned minute granules, the thermo-plastic resin minute granules and the cross-linked resin minute granules are bonded by themselves onto the surface of the polyester film substrate, and therefore both configurations of FIG. 1 example and FIG. 2 example can be utilized. Other minute granules of inorganic nature need binder layer 3 as shown in the example of FIG. 1.

As the resin for the thermo-plastic minute granules, the following are appropriate: polyesters of polyethyleneterephthalate, polybutyleneterephthalate, polyethylenenaphthalate, or various copolymers having the above-mentioned polymers as the center component; nylon 6, nylon 66, nylon 610, nylon 11, nylon 12 or various polyamides consisting of their copolymers; polycarbonate; polyarylate; polysulfon; polyethersulfon; polyphenyleneoxide; phenoxy resin; etc. But other resins such as polyethylene, polyacrylate, polyvynilchrolide, etc. are also usable.

In order to produce the granular protrusions by means of the above-mentioned organic resins, the following two methods are usable:

(1) A method of applying a solution prepared by mixing a solvent (non-solvent) which will hardly dissolve the thermo-plastic resin and a solution of the thermo-plastic resin of a concentration of 1% or lower, preferably 0.1% or lower, together and after coating the solution on the substrate, the coated solution is dried to produce the composite substrate of FIG. 2 (wherein the granules of the thermo-plastic resin are formed by separation induced upon the addition of the non-solvent to produce a dispersion state or by dispersion separation during the drying after the coating of the mixture solution; these may be selected by combination of the thermo-plastic resin, solvent to dissolve it and the non-solvent to be added), or (2) of adding another resin as a binder, which can embrace the above granules, to the above-mentioned mixture solution so as to form the binding layer 3 of FIG. 1, followed by drying of the binding layer.

As the cross-linked resin granules, a microgel granule consisting of the cross-linked macromolecule is usable. For this microgel granule of the cross-link macromolecule, the granules obtained by emulsion polymerization obtained by using a monomer having two or more unsaturated double bonds (a polyfunctional monomer) as the main material and having the granule diameter of 2000 Å or smaller, preferably 50–1000 Å, are suitable. As the polyfunctional monomer, for instance, divinylbenzene, ethylene glycol dimethacrylate, neobenzil glycol dimethacrylate, 1, 3-butylene glycol diacrylate, methylene bisacrylamide, trimethylolpropane triacrylate, tetramethylolmethane tetraacrylate, etc., may be used. Besides the above-mentioned polyfunctional monomers monomers such as styrene, acrylic acid, methacrylic acid, itaconic acid, allylacrylate, allylmethacrylate, acrylamide, methacrylamide, acrylonitrile, vinyl acetate or vinyl chloride may be added. The microgel granule dispersion solution is prepared by adding an emulsifier such as sodium dodecyl sulfonate and a reaction accelerater such as $K_2S_2O_8 \cdot NaHCO_3$ to an aqueous dispersion of a monomer selected from the above-mentioned group of monomers, and reacting for 10–30 hours at 50° C., in an aqueous dispersion of a monomer concentration of about 10%, followed by removal of inorganic salts by dialysis. The resultant liquid is diluted by solvent alcohol, ester or ketone, and is coated on the plastic film substrate and dried to form the undercoating layer with granular protrusions as shown in FIG. 2. When an undercoating layer shown in FIG. 1 is needed, a diluted solution of the above-mentioned microgel is added with a binder selected from the group consisting of thermo-plastic resins and cross-linked resins, then is coated on the plastic substrate and dried.

As the metal oxide minute granules, for instance, fine powdered silica obtained through the dry method from tetrachlorosilane (for instance: Aerosil of Japan Aerosil Corporation), fine powder obtained from the composition by acid or alkali treatment of sodium silicate (for example: Syloid of Fuji Devison Chemical Corporation of Japan), silicazol granule obtained by ion exchange of sodium silicate (for instance, Snowtex and Nissan Chemical Industrial Corporation of Japan), are obtainable and by dispersing the powder or granules in a solution mainly consisting of water, alcohol, ketone or ester, then filtering coarse granules, if necessary, the granules are applied on the plastic film substrate.

As the carbon minute granules, carbon black obtained by the oil furnace method, channel method, gas furnace method, thermal method and acetylene black, etc. are usable. These are dispersed in organic solvent such as ketone, ester, alcohol, or in the organic solvent of an aliphatic or aromatotic hydrocarbon, etc., followed by filtration of the coarse particles, if necessary.

As the granules of the hydrolysis product of a metal alkoxide, the following are usable: tetraethoxysilane, aluminum s-butoxide, aluminum t-butoxide, aluminum isopropoxide, aluminum methoxide, triisopropyl borate, trimethyl borate, tri-tert-butyl borate, titanium tetra-i-propoxide, titanium tetra-n-butoxide, tetra-n-butoxide titanate, tetrakis (2-ethyl hexyl) titanate, titanium tri-n-buthoxyl monostearate, tetramethyltitanate, tetraethyl-titanate, zirconium-tetra-t-butoxide, tetraisopropyl zirconate, indium isopropoxide.

As the minute granules produced by the hydrolytic decomposition product of the metal alkoxide, to a diluted solution of 10–1000 ppm of the above-mentioned metal alkoxide, 1–50% of solvent containing 10–1000 ppm water is added, to hydroxylate the metal alkoxide to produce minute granules of 30–500 Å as dispersion in the solvent.

By adding a resin binder to the dispersion of the minute granules of the metal alkoxide hydrolysis product or silica minute granules or carbon minute granules and coating on the surface of the plastic film substrate and drying, the granular protrusions are obtainable.

As the binder for binding the inorganic minute granules on the plastic film substrate, a single substance, copolymer or mixture of saturation polyester such as polyethyleneterephthalate, polybutyleneterephthalate, polyethylenenaphthalate, etc. polyamides such as nylon 6, nylon 66, nylon 610, nylon 11, nylon 12, etc., polystyrol, polycarbonate, polyarylate, polysulfon, polyethersulfon, polyacrylate, polyvinylchloride, polyvinylbutyral, polyphenylenoxide, phenoxy resins, etc. can be used. Also, cross-linked resins such as epoxy resin, urethane resin, silicon resin, phenol resin, melamine resin or denatured resins thereof can be used.

As a method to produce the layer comprising the minute granules and the binder, for example, there is a method such that, into a colloidal solution containing dispersed minute granules of 30–500 Å diameter at a rate of 10–1000 ppm, a resin to become the binder is dissolved at a rate of 20–20,000 ppm, and the mixed solution is applied on the plastic film substrate and dried.

In forming the ferromagnetic thin film 4, for instance, oblique vacuum deposition or vertical vacuum deposition of a metal thin film of Co, Ni, Fe, etc. or a metal thin film containing these metals as host material (for instance, Co-Cr vertical magnetization film) can be used. But in general, in order to improve the bonding strength of the ferromagnetic thin film to the polyester substrate or to further improve the corrosion-resistivity and abrasion-resistivity of the ferromagnetic thin film as such, it is preferable to use an oxygen-dominant atmosphere during the vapor deposition thereof, thereby to produce ferromagnetic thin film partly containing oxygen in it. Preferable contents of the oxygen in the ferromagnetic thin film or the reinforcing non-magnetic metal thin film should be at least 3% or more, preferably 5% or more.

When necessary, prior to the forming of the above-mentioned ferromagnetic thin film, such an undercoating film having a reinforcing effect such as oxygen-containing thin film of a metal such as Ti, Cr or Ni or an oxide film such as $Al_2O_3$ or $SiO_2$ may be formed to enforce the bonding of the ferromagnetic thin film.

As above-mentioned, as a result of the combination of the undercoating layer having the granular protrusions with a ferromagnetic metal thin film containing oxygen or with the nonmagnetic metal thin layer to be formed thereunder, the still life of the magnetic recording medium can be drastically improved. The still life has a relation with respect to the thickness of the ferromagnetic thin film, and when the thickness is 400 Å or smaller, the still life rapidly decreases, and therefore the thickness of the ferromagnetic thin film should be preferably 400 Å or more.

By forming a lubricant layer 5 on the surface of the ferromagnetic thin film, improvement of the tape running characteristic is further attainable, and thereby prevention of squealing in hot temperatures and high moisture becomes further perfect. The lubricant layer can be formed by depositing the below-mentioned organic or inorganic lubricant as such simply on the ferromagnetic thin film surface, or can be applied in a form of thin resin coating formed by applying a solution containing the lubricant substance and plastic resin. The lubricant layer 5 may be formed on all of the ferromagnetic thin film surface, or alternatively on limited parts, namely above the top parts of the protrusions only as depicted in FIG. 1.

The lubricant layer 5 can be formed by direct coating on the surface of the ferromagnetic thin film, or alternatively by firstly coating on the rear side of the plastic film substrate and then transferring it on to the front surface side (on the ferromagnetic thin film) when the magnetic recording media is wound up on a roll.

For the organic lubricant, fatty acid, fatty acid esters, fatty acid amides, metallic soaps, aliphatic alcohols, paraffins, silicones, fluorine-surfactants, inorganic lubricants, etc. are usuable.

In any case, the amount of the lubricant to attain the lubrication effect should be at a rate of 0.5–500 mg/m$^2$, and a more preferable range is 5–200 mg/m.

As the fatty acid, those having 12 carbons or more, such as lauric acid, myristic acid, palmitic acid, stearic acid, behenic acid, oleic acid, linolic acid, linolenic acid, etc., can be used.

As the fatty acid esters, stearic acid ethyl, stearic acid butyl, stearic acid amyl, stearic acid monoglyceride, palmitic acid monoglyceride, oleic acid monoglyceride, pentaerythritol-tetrastearate, etc., can be used.

As the fatty acid amide, caproic acid amide, capric acid amide, lauric acid amide, palmitic acid amide, stearic acid amide, behenic acid amide, oleic acid amide, linolic acid amide, methylene bis-stearic acid amide and ethylene bis-stearic acid amide, etc., can be used.

As the metal soap, salts of lauric acid, myristic acid, palmitic acid, stearic acid, behenic acid, oleic acid, linolic acid, linolenic acid and zinc, lead, nickel, cobalt, iron, aluminum, magnesium, strontium, copper, etc., and salts of alkyl sulfonates derived from acids of lauryl, palmitil, myristil, stearyl-behenyl, oleyl, linol, linolen, etc., and the above-mentioned metals can be used.

As the aliphatic alcohols, cetyl alcohol and stearil alcohols can be used.

As the paraffin, such saturated hydrocarbons as n-octadecane, n-nonadecane, n-tridecane, n-docosane, n-dotriacontane, etc., can be used.

As the silicone, polysiloxane having its hydrogens partly substituted by an alkyl group or phenyl group, and those further denatured by fatty acids, aliphatic alcohols, acid amide or the like can be used.

As the fluorine surfactant, salts of perfluoroalkyl carboxylic acid or perfluoroalkyl sulfonic acid and sodium, potassium, magnesium, zinc, aluminium, iron, cobalt or nickel, and perfluoroalkyl phosphate ester, perfluoroalkyl betaine, perfluoroalkyltrimethyl ammonium salt, perfluoroethylene oxide, perfluoroalkyl fatty acid ester, etc., can be used.

As inorganic lubricant, graphite powder, molybdenum disulfide powder, a wolfram disulfide powder, molybdenum selenide powder, wolfram selenide powder, calcium fluoride powder or the like can be used.

The lubricant layer is formed by applying the above-mentioned lubricant as such or solving the lubricant and a synthetic resin into a solution and formed, or by depositing from a vapor of the lubricant substance on the ferromagnetic thin film surface. In case of the above-mentioned application of the solution, polyester resin, epoxy resin, urethane resin, etc. as binder and an anti-static agent, antirust agent, or the like additives can be added. The lubricant may be formed partly, for instance, in check pattern shaped or oblique stripe-shaped or dot-shaped pattern in some cases.

Further, on the front surface and rear surface of the magnetic recording medium made in accordance with the above process, and further in pin-holes of the ferromagnetic metal thin film and at the interface of the ferromagnetic thin film and the plastic film substrate and further inside the plastic film substrate as such, known anti-corrosive agents, anti-electric charge agents, anti-mold agents or the like additives may be added when needed.

The magnetic recording medium in accordance with the present invention manufactured as above the satisfactory improvement in prevention of squealing at high temperature and high moisture conditions and of still life and further in envelope characteristics. The reason of the envelope characteristic improvement is believed to be that touching of the head cylinder and the magnetic recording medium is made at the tops of granular protrusions on the ferromagnetic thin film surface, the top parts having a relatively large rate of curvature, and the distribution and heights of the granular protrusions are considerably even and uniform. And this uniformnesses is believed to be higher than those of the magnetic recording medium having granular protrusions induced by oligomer separation at the surface of polyester film substrate.

Hereafter, the present invention is elucidated in more detail with respect to examples embodying the present invention and the comparison examples in the following:

Firstly, examples having thermo-plastic resin minute granules as nuclei are elucidated.

EXAMPLE 1

A smooth faced polyethyleneterephthalate diaxial stretched film with greatly suppressed protrusions induced by polymerization catalyst residue and having a roughness of 30 Å or lower is used as a starting plastic film substrate. On one surface of the smooth faced polyethyleneterephthalate film substrate, a solution having the following composition is applied to a thickness of about 10 μm by means of a continuous coating process and dried, thereby to obtain a belt-shaped film having a large number of granules consisting of polycarbonate having about 50 Å height and distributed at a rate of 1,000,000 granules/mm². And this is designated Sample A.

| Composition of the solution: | |
|---|---|
| polycarbonate (Ubilon E2000U of Mitsubishi Gas Chemical Co., Ltd. of Japan) | 0.05 phr |
| methylene chloride | 100 phr |
| benzene | 100 phr |
| n-butanol | 800 phr. |

EXAMPLE 2

EXAMPLE 1 is repeated except the composition of the solution is changed to that given below, and a plastic film substrate with the undercoating layer having granular protrusions consisting of polyester and having heights of about 200 Å and distributed at a rate of about 100,000 protrusions/mm² is obtained, and this is designated Sample B.

| Composition of the solution: | |
|---|---|
| polyester (Vylon #200 of Toyobo Co., Ltd., Japan) | 0.1 phr |
| ethyl acetate | 100 phr |
| benzene | 100 phr |
| n-butanol | 800 phr. |

EXAMPLE 3

EXAMPLE 1 is repeated excepted that the composition of the solution is changed to that given below, and a plastic film substrate with the undercoating layer having granular protrusions consisting of nylon 66 and having heights of about 500 Å and distributed at a rate of about 2500 protrusions/mm² is obtained, and this is designated Sample C.

| Composition of the solution: | |
|---|---|
| nylon 66 (UBE 2020B of Ube Kosan Co., Japan) | 0.1 phr |
| phenol | 300 phr |
| cellosolve acetate | 700 phr. |

COMPARISON EXAMPLE 1

By changing the amount of the nylon 66 added in EXAMPLE 3 to 0.02 phr but containing other compositions in the same amount as the EXAMPLE 3, a similar type plastic film substrate with the undercoating layer having granular protrusions consisting of nylon 66 of about 500 Å height distributed at a rate of about 500 protrusions/mm² is obtained; this is designated Sample D.

EXAMPLE 4

EXAMPLE 1 was repeated except the composition of the solution is changed to that given below, and a plastic film substrate with the undercoating layer having granular protrusions consisting of polyarylate and having heights of about 300 Å and distributed at a rate of about 100,000 protrusions/mm², and this is designated Sample E.

| Composition of the solution: | |
|---|---|
| polyallylate | 0.1 phr |
| (U-2030 of Unichica Co. of Japan) | |
| methylene chloride | 100 phr |
| methanol | 900 phr |
| water | 10 phr. |

EXAMPLE 5

EXAMPLE 1 was repeated except the composition of the solution is changed to that given below, and a plastic film substrate with the undercoating layer having granular protrusions consisting of polysulfon and distributed at a rate of about 10,000 protrusions/mm² is obtained; and this is designated Sample F.

| Composition of the solution: | |
|---|---|
| polysulfon | 0.1 phr |
| (Udel P-1800 | |
| of Nissan Chemical Industries Ltd. of Japan) | |
| methylene chloride | 100 phr |
| benzene | 100 phr |
| ethyl acetate | 800 phr. |

EXAMPLE 6

EXAMPLE 1 is repeated except that the composition of the solution is changed to that given below, and a plastic film substrate with the undercoating layer having granular protrusions consisting of polyethersulfon and having heights of about 200 Å and distributed at a rate of about 500,000 protrusions/mm² is obtained, and this is designated Sample G.

| Composition of the solution: | |
|---|---|
| polyethersulfon | 0.1 phr |
| (PES 200P | |
| of ICI Japan Inc. of Japan) | |
| methylene chloride | 100 phr |
| methanol | 900 phr |
| water | 10 phr. |

EXAMPLE 7

EXAMPLE 1 is repeated and this time the composition of the solution is changed to that given below, and a plastic film substrate with the undercoating layer having granular protrusions consisting of polyphenylenoxide and having heights of about 100 Å and distributed at a rate of about 500,000 protrusions/mm² is obtained, and this is designated Sample H.

| Composition of the solution: | |
|---|---|
| polyphenyleneoxide | 0.02 phr |
| (Engineering Plastics Co. of Japan) | |
| polyester (Vylon #200) | 0.1 phr |
| dimethylformamide | 50 phr |
| dimethylsulfoxide | 50 phr |
| toluene | 200 phr |
| ethyl acetate | 500 phr |
| cellosolve acetate | 300 phr. |

EXAMPLE 8

EXAMPLE 1 is repeated except that the composition of the solution is changed to that given below, and a plastic film substrate with the undercoating layer having granular protrusions consisting of phenoxy resin and having heights of about 200 Å and distributed at a rate of about 200,000 protrusions/mm² is obtained, and this is designated Sample I.

| Composition of the solution: | |
|---|---|
| phenoxy resin | 0.05 phr |
| (Tomoe Industries Co. of Japan) | |
| ethyl acetate | 200 phr |
| ethanol | 800 phr |
| water | 50 phr. |

EXAMPLE 9

EXAMPLE 1 is repeated except that the composition of the solution is changed to that given below, and a plastic film substrate with the undercoating layer having granular protrusions consisting of nylon 66 bonded by phenoxy resin as a binder and having about 200 Å height distributed at a rate of about 200,000 protrusions/mm² is obtained, and this is designated Sample J.

| | |
|---|---|
| nylon 66 (UBE 2020B) | 0.01 phr |
| phenoxy resin | 0.05 phr |
| phenol | 100 phr |
| cellosolve acetate | 900 phr |

EXAMPLE 10

A smooth faced polyethyleneterephthalate film containing substantially no minute granules induced by polymerization catalyst residue is prepared as a starting plastic film substrate. On one surface of the smooth faced polyethyleneterephthalate film substrate, a solution mainly comprising a denatured silicon emulsion containing a viscosity increasing agent is applied during the stretching process of the plastic film and dried, to form polyethyleneterephthalate diaxial stretch film having minute wave-like protrusions of about 100 Å surface roughness of macromolecules different from that of the substrate, during the stretching. This composite film is used as the belt-shaped plastic film substrate, and thereon the same coatings as described in EXAMPLEs 1 through 9 are formed, and these are designated Samples K, L, M, N, O, P, Q, R and S. The granular protrusions formed on the plastic film substrates have the same nature to those of corresponding Samples A to J with D omitted, respectively.

COMPARISON EXAMPLE 2

In the example 10, the under coating layer on the surface of the plastic film substrate is omitted and the sample is designated Sample T.

EXAMPLE 11

The above-mentioned Samples A through T are bonded to form a continuous belt-shape substrate, and by means of known continuous oblique vacuum deposition method a ferromagnetic metal thin film of Co-Ni (Ni: 20 wt %) of 1000 Å film thickness is formed in the presence of a small amount of oxygen gas. Oxygen content against the metals in the ferromagnetic metal thin film was 5% in atom ratio. And then, a lubrication layer is coated on the samples, and the samples are cut into predetermined widths as the magnetic recording tapes and the tapes are tested under a 30° C. and 90% RH environment by running around a head cylinder of a video tape recorder. And the squealing, enveloped and still life characteristics are measured for respective tapes.

As another comparison Sample T', the plastic film substrate used to the sample tape T is heat-treated prior to vacuum vapor deposition of the ferromagnetic metal thin film, to separate the polyester oligomer crystal protrusions of about 300 Å height and distributed at a density of about 100,000 protrusions/mm² under the ferromagnetic metal thin film, thereby forming the similar protrusions on the surface of the magnetic recording medium. And the above-mentioned lubrication layer is formed thereon. Besides, other comparison samples are made by omitting the formation of the lubrication layers on the above-mentioned samples A, B and C, and these samples are designated as comparison samples A', B' and C'. For the above-mentioned comparison samples T', A', B' and C', the above-mentioned measurements are carried out, thus the following results are obtained.

TABLE 1

| Serial No. Numbers in ( ) are comparison samples. | Sample | Lubrication layer (amount, mg/m²) | Squealing | Envelope | Still life (minutes) |
|---|---|---|---|---|---|
| 1 | A | Stearic acid (5) | Nil | Good | 40 |
| 2 | B | Stearic acid (20) | Nil | Good | 60 or longer |
| 3 | C | Stearic acid (100) | Nil | Good | 60 |
| (4) | D | Stearic acid (100) | Exist | Bad | 30 |
| 5 | E | Palmitic acid amide (10) | Nil | Good | 60 or longer |
| 6 | F | Palmitic acid amide (10) | Nil | Good | 40 |
| 7 | G | Palmitic acid amide (50) | Nil | Good | 60 or longer |
| 8 | H | Palmitic acid amide (10) | Nil | Good | 60 |
| 9 | I | Lauric acid monoglyceride (50) | Nil | Good | 50 |
| 10 | J | Lauric acid monoglyceride (50) | Nil | Good | 40 |
| 11 | K | Lauric acid monoglyceride (10) | Nil | Good | 30 |
| 12 | L | Lauric acid monoglyceride (10) | Nil | Good | 60 or longer |
| 13 | M | Zinc stearate (50) | Nil | Good | 60 or longer |
| 14 | N | Zinc stearate (10) | Nil | Good | 60 or longer |
| 15 | O | Zinc stearate (10) | Nil | Good | 50 |
| 16 | P | Zinc stearate (20) | Nil | Good | 60 |
| 17 | Q | Pentaerythritol-tetra-stearate (10) | Nil | Good | 60 or longer |
| 18 | R | Pentaerythritol-tetra-stearate (10) | Nil | Good | 60 or longer |
| 19 | S | Pentaerythritol-tetra-stearate (10) | Nil | Good | 30 |
| (20) | T | Stearic acid (5) | Exist | Bad | 10 |
| (21) | T' (oligomer deposition) | Stearic acid (20) | Nil | Slightly bad | 60 |
| (23) | A' | Nil | Exist | Bad | 10 |
| (24) | B' | Nil | Slightly exist | Slightly bad | 30 |
| (25) | C' | Nil | Slightly exist | Slightly bad | 20 |

The following examples 2-1 to 2-5 are those having undercoating layers with granular protrusions made by cross-linked resins.

EXAMPLE 2-1

A smooth faced polyethyleneterephthalate diaxial stretched film with greatly suppressed protrusions induced by polymerization catalyst residue and having roughness of 30 Å or lower is used as a starting plastic film substrate. On one surface of the smooth faced polyethyleneterephthalate film substrate, a solution having the following contents is made, to form about 10 $\mu$m coating is continuously formed and dried, thereby to obtain a long belt-shaped film having a large number of protrusions having nuclear microgel granules of 150 Å height, and distributed at a rate of about 300,000 protrusions/mm$^2$, and this is designated Sample A-2.

| Composition of the solution: | |
| --- | --- |
| divinylbenzene:styrene (4:1) copolymerization microgel granules (average granule diameter is about 200 Å observed by a scanning electron microscope) | 0.05 phr |
| sodium dodecyl sulfonate | very small amount |
| water | 10 phr |
| ethyl alcohol | 1000 phr |

EXAMPLE 2-2

In EXAMPLE 2-1, composition of the solution is changed to the below mentioned one, and a belt-shaped plastic film substrate with protrusions having microgel granules as their nuclei and having heights of about 300 Å and distributed at a rate of about 500,000 protrusions/mm$^2$ is obtained, and this is designated Sample B-2.

| Composition of the solution: | |
| --- | --- |
| trimethylolpropanetriacrylate:methylmethacrylate (1:1) copolymerization microgel granules (average granule diameter is about 400 Å) observed by a scanning electron microscope) | 0.1 phr |
| sodium dodecyl sulfonate | very small amount |
| water | 2 phr |
| methylethylketone | 1000 phr |
| polyester (Vylon #200 of Toyobo Co., Ltd. Japan) | 1 phr |

EXAMPLE 2-3

In the EXAMPLE 2-1, the composition of the solution is changed to belowmentioned one, and a belt-shaped plastic film substrate with the undercoating layer having granular protrusions having microgel granules as nuclei and having heights of about 100 Å and distributed at a rate of about 1,000,000 protrusions/mm$^2$ is obtained, and this is designated Sample C-2.

| Composition of the solution: | |
| --- | --- |
| divinylbenzene microgel granules | 0.1 phr |

| -continued | |
| --- | --- |
| Composition of the solution: | |
| (average granule diameter is about 150 Å) | |
| sodium dodecyl sulfonate | very small amount |
| water | 2 phr |
| methylethylketone | 1000 phr |
| polyester (Vylon #200) | 0.5 phr |

EXAMPLE 2-4

A smooth faced polyethyleneterephthalate film containing substantially no minute granules induced by polymerization catalyst residue is prepared as a starting plastic film substrate. On one surface of the smooth faced polyethyleneterephthalate film substrate a solution mainly comprising a denatured silicon emulsion containing a viscosity increasing agent is applied during the stretching process of the plastic film and dried, to form polyethyleneterephthalate diaxial stretched film having minute wave-like protrusions of about 100 Å surface roughness of different macromolecules from that of the substrate, during the stretching. This composite film is used as a belt-shaped plastic film and thereon the same coatings as described in EXAMPLES 2-1 through 2-3 are formed, and these are designated Sample K-2, L-2 and M-2, respectively. The granular resin protrusions formed on these samples are similar to those of the corresponding Samples A-2, B-2 and C-2, respectively.

COMPARISON EXAMPLE 2-1

The plastic film substrate as such used in the EXAMPLES 2-1 to 2-3 and EXAMPLE 2-4 are designated Sample S-2 and Sample T-2.

EXAMPLE 2-5

By connecting the above-mentioned Samples A-2 through C-2, K-2 through M-2, S-2 and T-2, and by means of continuous oblique vacuum deposition method, a ferromagnetic metal thin film of Co-Ni (Ni: 20 wt %) of about 1000 Å thickness is coated under existence of a very small amount of oxygen. The oxygen contents to metal of the ferromagnetic metal thin film was 5 atom %. Thereafter, by coating various lubrication layers of the connected samples and by cutting the connected samples into stripes to make various magnetic recording medium, and these various kinds of magnetic recording medium are tested under a harsh condition of 30° C. and 90% RH by passing them around a head cylinder to examine squealing, envelope and still life characteristics. Besides, by carrying out a thermal treatment to separate polyester oligomer crystals on the surface of the plastic film substrate prior to the vacuum deposition of the ferromagnetic thin film, hence, minute protrusions having about 300 Å height and distributed at a rate of 100,000 protrusions/mm$^2$ are formed. Thereafter, on some of them, the above-mentioned lubrication layer is formed by coating the solution, and the above-mentioned various samples are measured for their characteristics, and they are shown in TABLE 2.

TABLE 2

| Serial No. Numbers in ( ) are comparison samples. | Sample | Lubrication layer (amount, mg/m$^2$) | Squealing | envelope | Still life (minutes) |
|---|---|---|---|---|---|
| 1 | A-2 | Stearic acid (10) | Nil | Good | 60 |
| 2 | B-2 | Stearic acid (30) | Nil | Good | 60 or longer |
| 3 | C-2 | Palmitic acid amide (100) | Nil | Good | 50 |
| 4 | K-2 | Palmitic acid amide (50) | Nil | Good | 60 |
| 5 | L-2 | Lauric acid monoglyceride (50) | Nil | Good | 60 or longer |
| 6 | M-2 | Pentaerythritol-tetra-stearate (10) | Nil | Good | 60 |
| (7) | S-2 | Pentaerythritol-tetra-stearate (10) | Exist | Bad | 5 |
| (8) | T-2 | Stearic acid (5) | Exist | Bad | 10 |
| (9) | T-2 (oligomer separates) | Stearic acid (20) | Nil | Slightly bad | 60 |
| (10) | A-2 | Nil | Slightly exist | Bad | 15 |
| (11) | B-2 | Nil | Slightly exist | Slightly bad | 20 |
| (12) | C-2 | Nil | Exist | Slightly bad | 10 |

Hereafter, examples having carbon minute granules in the undercoating layer are shown.

EXAMPLE 3-1

A smooth faced polyethyleneterephthalate diaxial stretched film with greatly suppressed protrusions induced by polymerization catalyst residue and having roughness of 30 Å or lower is used as a starting plastic film substrate. On one surface of the smooth faced polyethyleneterephthalate film substrate, a solution having the following composition is applied to a thickness of about 10 μm by means of continuous coating process and dried, thereby to obtain a belt-shaped film having a large number of protrusions with minute carbon granules as nuclei having 5000 Å height and distributed at a rate of about 10,000 protusions/mm$^2$. This is designated Sample A-3.

| Composition of the solution: | |
|---|---|
| carbon (PRINTEX 80, DEGUSA G.m.b.H. of West Germany) | 0.1 phr |
| ethyl acetate | 500 phr |
| toluene | 500 phr |
| polyester (Vylon #200 of Toyobo Co., Ltd. of Japan) | 0.5 phr |

EXAMPLE 3-2

In EXAMPLE 3-1, the composition of the sulution is changed to the belowmentioned one, and a belt-shaped plastic film substrate with the undercoating layer having granular protrusions containing carbon minute granules as nuclei and having about 100 Å height and distributed at a rate of about 2,000,000 protrusions/mm$^2$ is obtained, and this is designated Sample B-3.

| Composition of the solution: | |
|---|---|
| carbon | 0.02 phr |

| -continued | |
|---|---|
| Composition of the solution: | |
| (NEO SPECTRA MARK II of Columbia Carbon Japan Inc.) | |
| methylenechloride | 500 phr |
| toluene | 300 phr |
| methylethylketone | 200 phr |
| polyethersulfone (PES 200P of ICI Japan Corp.) | 0.5 phr |

EXAMPLE 3-3

In EXAMPLE 3-1, the composition of the solution is changed to the belowmentioned one, and a belt-shaped plastic film substrate with the undercoating layer having granular protrusions containing carbon minute granules as nuclei having heights of about 300 Å and distributed at a rate of 100,000 protrusions/mm$^2$ is obtained, and this is designated Sample C-3.

| Composition of the solution: | |
|---|---|
| carbon (Channel #600 of Mitsubishi Chemical Industry Co., Ltd.) | 0.05 phr |
| methylethylketone | 600 phr |
| toluene | 400 phr |
| polyester (Vylon #200 of Toyobo Co., Ltd. Japan) | 0.5 phr |

EXAMPLE 3-4

In EXAMPLE 3-1, the composition of the solution is changed to the belomentioned one, and a belt-shaped plastic film substrate with the undercoating layer having granular protrusions containing carbon minute granules as nuclei having heights of about 200 Å and distributed at a rate of about 1,000,000 protrusions/mm$^2$ is obtained, and this is designated Sample D-3.

| Composition of the solution: | |
|---|---|
| carbon | 0.03 phr |
| (MONARCH #1300 of Cabot Corp. of USA) | |
| methylethylketone | 600 phr |
| toluene | 400 phr |
| polyester | 0.5 phr |
| (Vylon #200 of Toyobo Co., Ltd. Japan) | |

EXAMPLE 3-5

A smooth faced polyethyleneterephthalate film containing substantially no minute granules induced by polymerization catalyst residue is prepared as a starting plastic film substrate. On one surface of the smooth faced polyethyleneterephthalate film substrate a solution mainly comprising a denatured silicon emulsion containing a viscosity increasing agent is applied during the stretching process of the plastic film and dried, to form polyethyleneterephthalate diaxial stetched film having a minute wave-like protrusions of about 100 Å surface roughness of different macromolecule from that of the substrate, during the stretching. This composite film is used as a belt-shaped plastic film and thereon the same coatings as described in the examples 3-1 through 3-4 are formed, and these are designated Sample K-3, L-3 and N-3, respectively. The granular resin protrusions formed on these samples are similar to those of the corresponding Samples A-3 through D-3, respectively.

COMPARISON EXAMPLE 3-1

Of the EXAMPLES 3-1 through 3-4 and EXAMPLES 3-5, the plastic film substrate as such without the overriding undercoating layer, is designated Sample S-3 and Sample T-3.

EXAMPLE 3-6

The above-mentioned Samples A-3 through T-3 are connected in sequence and by means of continuous oblique vacuum deposition method, ferromagnetic thin film of Co-Ni (Ni: 20wt %) of film thickness of about 1000 Å are formed in the presence of a small amount of oxygen. Contents of the oxygen against metal in the ferromagnetic metal thin film is ≡atom %. Then, various lubrication layers is formed by applying various solutions of the lubricant. The resultant connected films are cut into belt-shaped magnetic recording media and tested under a severe condition of 30° C. and 90% RH by making them run around a head cylinder of a video recorder to examine characteristics of squealing, envelope and still life. Besides, as the comparison examples, Sample T is heat treated prior to vacuum vapor deposition of the ferromagnetic metal thin film to form polyester oligomer crystal at the surface, and thereafter, a ferromagnetic metal thin film is vacuum deposited, thereby to make the magnetic recording media having minute protrusion of about 300 Å distributed at a rate about 100,000 protrusions/mm$^2$ and induced from the oligomer crystals, with an overriding lubricant layer. And besides the above-mentioned comparison Samples A-3 through T-3, some of the same are tested without formation of the lubricant layer. And the test results are shown in the following TABLE 3.

TABLE 3

| Serial No. Numbers in ( ) are comparison samples. | Sample | Lubrication layer (amount, mg/m$^2$) | Squealing | Envelope | Still life (minutes) |
|---|---|---|---|---|---|
| 1 | A-3 | Stearic acid amide | Nil | Good | 50 |
| 2 | B-3 | Stearic acid amide | Nil | Good | 60 |
| 3 | C-3 | Palmitic acid | Nil | Good | 50 |
| 4 | D-3 | Palmitic acid | Nil | Good | 60 or longer |
| 5 | K-3 | Stearic acid monoglyceride | Nil | Good | 50 |
| 6 | L-3 | Stearic acid monoglyceride | Nil | Good | 60 |
| 7 | M-3 | Pentaerythritol-tetra-stearate | Nil | Good | 60 |
| 8 | N-3 | Pentaerythritol-tetra-stearate | Nil | Good | 60 or longer |
| (9) | S-3 | Palmitic acid | Exist | Bad | 1 |
| (10) | T-3 | Palmitic acid | Exist | Bad | 10 |
| (11) | T-3 (Oligomer deposition) | Stearic acid amide | Nil | Slightly bad | 60 |
| 12 | A-3 | Nil | Slightly exist | Slightly bad | |
| 13 | B-3 | Nil | Slightly exist | Slightly bad | |

Hereinafter, examples utilizing silica minute granules to form protrusions in the undercoating layer is elucidated.

EXAMPLE 4-1

A smooth faced polyethyleneterephthalate diaxial stretched film with greatly suppressed of protrusions induced by polymerization catalyst residue and having roughness of 30 Å or lower is used as a starting plastic film substrate. On one surface of the smooth faced polyethyleneterephthalate film substrate, a solution having the following composition is applied to a thickness of about 10 μm by means of continuous coating process and dried, thereby to obtain a belt-shaped film having a large number of protrusions having nuclear of silica minute granules of 100 Å height, and distributed at a rate of 5,000,000 granules/mm$^2$. And this is designated Sample A-4.

| Composition of the solution: | |
|---|---|
| silica powder | 2 phr |

| Composition of the solution: | |
|---|---|
| (Snowtex No. 0 of Nissan Chemical Industries Co., Ltd. Japan) | |
| methanol | 200 phr |
| ethyl acetate | 800 phr |
| polyester | 0.3 phr |
| (Vylon #200 of Toyobo Co., Ltd. Japan). | |

EXAMPLE 4-2

In EXAMPLE 4-1, the composition of the solution is changed to the belowmentioned one, and a belt-shaped plastic film substrate with the undercoating layer having granular protrusions containing silica minute granules as nuclei and having heights of about 80 Å and distributed at a rate of about 1,000,000 protrusions/mm² is obtained, and this is designated Sample B-4.

| Composition of the solution: | |
|---|---|
| silica powder | 0.05 phr |
| (Syloid #255 of Fuji Devison Chemical Co., Ltd. of Japan) | |
| methylene chloride | 600 phr |
| toluene | 100 phr |
| methylethyl ketone | 300 phr |
| polyether sulfone | 0.2 phr |
| (PES 200P of ICI Japan, Ltd. of Japan). | |

EXAMPLE 4-3

In EXAMPLE 4-1, the composition of the solution is changed to the belowmentined one, and a belt-shaped plastic film substrate with the undercoating layer having granular protrusions containing silica minute granules as nuclei and having heights of about 200 Å and distributed at a rate of about 200,000 protrusions/mm² is obtained, and this is designated Sample C-4.

| Composition of the solution: | |
|---|---|
| methanol silica sol | 0.1 phr |
| (Nissan Chemical Industries Co., Ltd. of Japan) | |
| methanol | 200 phr |
| ethyl acetate | 1000 phr |
| toluene | 100 phr |
| polyester | 0.5 phr |
| (Vylon #200 of Toyobo Co., Ltd. Japan). | |

EXAMPLE 4-4

EXAMPLE 1 was repeated this time and the composition of the solution is changed to the belowmentioned one, and a belt-shaped plastic film substrate with the undercoating layer having granular protrusions containing silica minute granules as nuclei and having heights of about 250 Å and distributed at a rate of about 500,000 protrusions/mm² is obtained, and this is designated Sample D-4.

| Composition of the solution: | |
|---|---|
| silica powder | 0.1 phr |

| Composition of the solution: | |
|---|---|
| (Aerosil #972) | |
| acetone | 500 phr |
| ethyl acetate | 400 phr |
| toluene | 100 phr |
| phenoxy resin | 0.3 phr |
| (Tomoe Kogyo, Ltd. of Japan). | |

EXAMPLE 4-5

A smooth faced polyethyleneterephthalate film containing substantially no minute granules induced by a polymerization catalyst residue is prepared as a starting plastic film substrate. On one surface of the smooth faced polyethyleneterephthalate film substrate a solution mainly comprising a denatured silicon emulsion containing a viscosity increasing agent is applied during the stretching process of the plastic film and dried, to form polyethyleneterephthalate diaxial stretched film having minute wave-like protrusions of about 100 Å surface roughness of different macromolecule from that of the substrate, during the stretching. This composite film is used as a belt-shaped plastic film and thereon the same coatings are described in the EXAMPLES 4-1 through 4-4 are formed, and these are designated Sample K-4, L-4, M-4 and N-4, respectively. The granular resin protrusions formed on these samples are similar to those of the corresponding Samples A-4 through D-4, respectively.

COMPARISON EXAMPLE 4-1

In the EXAMPLES 4-1 through 4-4 and EXAMPLES 4-5, the plastic film substrate as such without the overriding undercoating layer, is designated Sample S-4 and Sample T-4.

EXAMPLE 4-6

The above-mentioned Samples A-4 through T-4 are connected in sequence, and by means of continuous oblique vacuum vapor deposition method a ferromagnetic thin film of Co-Ni (Ni: 20 wt %) of film thickness of about 1000 Å is formed in the presence of a small amount of oxygen. Contents of the oxygen against metal in the ferromagnetic metal thin film is 5 atom %. Then, various lubrication layers are formed by applying various solutions of the lubricant. The resultant connected films are cut into belt-shaped magnetic recording media and tested under a severe condition of 30° C. and 90% RH by making them run around a head cylinder of a video recorder to examine the characteristics of squealing, envelope and still life. Besides, as comparison examples, Sample T is heat-treated prior to vacuum deposition of the ferromagnetic metal thin film, to form polyesther oligomer crystal at the surface. Thereafter, a ferromagnetic metal thin film is vacuum deposited thereby to make the magnetic recording media having minute protrusion of about 300 Å height and distributed at a rate about 100,000 protrusions/mm² induced from the oligomer crystals with an overriding lubricant layer, and besides, the above-mentioned comparison Samples A-4 through T-4, are tested as such some of which are tested without formation of the lubricant layer. The test results are shown in the following TABLE 4.

TABLE 4

| Serial No. Numbers in ( ) are comparison samples. | Sample | Lubrication layer (amount, mg/m²) | Squealing | Envelope | Still life (minutes) |
|---|---|---|---|---|---|
| 1 | A-4 | Stearic acid amide | Nil | Good | 60 |
| 2 | B-4 | Stearic acide amide | Nil | Good | 50 |
| 3 | C-4 | Palmitic acid | Nil | Good | 60 |
| 4 | D-4 | Palmitic acid | Nil | Good | 60 or longer |
| 5 | K-4 | Stearic acide monoglyceride | Nil | Good | 60 or longer |
| 6 | L-4 | Stearic acid monoglyceride | Nil | Good | 60 |
| 7 | M-4 | Pentaerythritol tetrastearate | Nil | Good | 60 |
| 8 | N-4 | Pentaerythritol tetrastearate | Nil | Good | 60 or longer |
| (9) | S-4 | Palmitic acid | Exist | Bad | 1 |
| (10) | T-4 | Palmitic acid | Exist | Bad | 10 |
| (11) | T-4 (Oligomer deposition) | Stearic acid | Nil | Slightly bad | 60 |
| 12 | A-4 | Nil | Slighly exist | Slightly bad | 25 |
| 13 | B-4 | Nil | Sligtly exist | Slightly bad | 15 |

Hereinafter, examples utilizing minute granules of a metalalkoxydhydrolysis product to form protrusions in the undercoating layer are elucidated.

EXAMPLE 5-1

A smooth faced polyethyleneterephthalate diaxial stretched film with greatly suppressed of protrusions induced by polymerization catalyst residue and having roughness of 30 Å or lower is used as as starting plastic film substrate. On one surface of the smooth faced polyethyleneterephthalate film subtrate, a solution having the following composition is applied to a thickness of about 10 μm by means of continuous coating process and dried, thereby to obtain a belt-shaped film having a large number of protrusions having nuclei of minute; granules of the hydrolysis product of tetraethoxy silane of 100 Å height, and distributed at a rate of 1,000,000 granules/mm². And this is designated Sample A-5.

| Composition of the solution: | |
|---|---|
| tetraethoxy silane | 0.1 phr |
| ethanol | 100 phr |
| water | 10 phr |
| ethyl acetate | 1000 phr |
| polyester (Vylon #200 of Toyobo Co., Ltd. Japan) | 0.1 phr |

EXAMPLE 5-2

In EXAMPLE 5-1, the composition of the solution is changed to the belowmentioned one, and a belt-shaped plastic film substrate with the undercoating layer having granular protrusions containing the hydrolysis product of aluminum isopropoxide as nuclei and having heights of about 400 Å and distributed at a rate of about 100,000 protrusions/mm² is obtained, and this is designated Sample B-5.

| Composition of the solution: | |
|---|---|
| aluminiumisopropoxide | 0.2 phr |
| methanol | 100 phr |
| water | 20 phr |
| methylethyl ketone | 1000 phr |
| polyester (Vylon #200) | 0.1 phr |

EXAMPLE 5-3

In EXAMPLE 5-1, the composition of the solution is changed to the belowmentioned one, and a belt-shaped plastic film substrate with the undercoating layer having granular protrusions containing the hydrolysis product of tetra-n-butoxititanate as nuclei, having heights of about 50 Å and distributed at a rate of about 1,000,000 protrusions/mm² is obtained. This is designated Sample C-5.

| | |
|---|---|
| tetra-n-butoxititanate | 0.05 phr |
| n-propanol | 100 phr |
| water | 20 phr |
| ethyl acetate | 1000 phr |
| Polyester (Vylon #200) | 0.1 phr |

EXAMPLE 5-4

In EXAMPLE 5-1, the composition of the solution is changed to the belowmentioned one, and a belt-shaped plastic film substrate with the undercoating layer having granular protrusions containing the hydrolysis product of tetraisopropyl zirconate as nuclei and having heights of about 300 Å and distributed at a rate of about 500,000 protrusions/mm² is obtained, and this is designated Sample D-5.

| Composition of the solution: | |
|---|---|
| tetraisopropyl zirconate | 0.1 phr |
| isopropanol | 100 phr |
| water | 10 phr |
| methylethyl ketone | 1000 phr |
| polyester | 0.1 phr |

-continued

Composition of the solution:

(Vylon #200)

EXAMPLE 5-5

A smooth faced polyethyleneterephthalate film containing substantially no minute granules induced by polymerization catalyst residue is prepared as a starting plastic film substrate. On one surface of the smooth faced polyethyleneterephthalate film substrate a solution mainly comprising a denatured silicon emulsion containing a viscosity increasing agent is applied during stretching process of the plastic film and dried, to form polyethyleneterephthalate diaxial stretched film having minute wave-like protrusions of about 100 Å surface roughness of a different macromolecule from that of the substrate, during the stretching. This composite film is used as a belt-shaped plastic film and thereon the same coatings as described in the EXAMPLES 5-1 through 5-4 are formed, and these are designated Samples K-5, L-5, M-5 and N-5, respectively. The granular resin protrusions formed on these samples are similar to those of the corresponding Samples A-5 through D-5, respectively.

COMPARISON EXAMPLE 5-1

In the EXAMPLE 5-1 through 5-4 and EXAMPLES 5-5, the plastic film substrate as such without the overriding undercoating layer is designated Sample S-5 and Sample T-5.

EXAMPLE 5-6

The above-mentioned Samples A-5 through T-5 are connected in sequence and by means of continuous oblique vacuum vapor deposition method, a ferromagnetic thin film of Co-Ni (Ni: 20 wt %) of film thickness of about 1000 Å is formed in the presence of a small amount of oxygen. The oxygen content against metal in the ferromagnetic metal thin film is 5 atom %. Then, various lubrication layers are formed by applying various solutions of the lubricant. The resultant connected films are cut into belt-shaped magnetic recording media and tested under a severe condition of 30° C. and 90% RH by making them run around a head cylinder of a video recorder to examine the characteristics of squealing, envelope and still life. Besides, as the comparison examples, Sample T-5 is heat treated prior to vacuum vapor deposition of the ferromagnetic metal thin film to form polyester oligomer crystal: at the surface, and thereafter, a ferromagnetic metal thin film is vacuum deposited thereby to make the magnetic recording media, which have minute protrusions of about 300 Å distributed at a rate about 100,000 protrusions/mm$^2$ induced from the oligomer crystals and have an overriding lubrication layer. The above-mentioned comparison Samples A-5 through T-5, as such, and besides, some of the same without formation of the lubricant layer are tested by running them around a head cylinder. The test results are shown in the following TABLE 5.

| Serial No. Numbers in ( ) are comparison samples. | Sample | Lubrication layer (amount, mg/m$^2$) | Squealing | Envelope | Still life (minutes) |
|---|---|---|---|---|---|
| 1 | A-5 | Stearic acid (10) | Nil | Good | 60 |
| 2 | B-5 | Stearic acid (30) | Nil | Good | 60 or longer |
| 3 | C-5 | Palmitic acid amide (10) | Nil | Good | 40 |
| 4 | D-5 | Lauric acid monoglyceride (50) | Nil | Good | 60 |
| 5 | K-5 | Zinc stearate (10) | Nil | Good | 60 |
| 6 | L-5 | Zinc stearate (20) | Nil | Good | 60 or longer |
| 7 | M-5 | Pentaerythritol-tetra-stearate (30) | Nil | Good | 50 |
| 8 | N-5 | Stearic acid (20) | Nil | Good | 50 |
| (9) | S-5 | Stearic acid (5) | Exist | Bad | 1 |
| (10) | T-5 | Stearic acid (5) | Exist | Bad | 10 |
| 11 | T-5 (Oligomer deposition) | Stearic acid (20) | Nil | Slightly bad | 60 |
| 12 | A-5 | Nil | Slightly exist | Slightly bad | 20 |
| 13 | B-5 | Nil | Slightly exist | Slightly bad | 30 |

TECHNICAL ADVANTAGE OF THE PRESENT INVENTION

As has been elucidated with many examples, the magnetic recording medium embodying the present invention has satisfactory characteristics of no squealing even in a severe operating conditions of high moisture and high temperature, has a satisfactory envelope characteristic as well as long still life in such high moisture, has a good, stable running performance, and is very useful as a magnetic recording media for VTR tape, etc.

What is claimed is:
1. A magnetic recording medium comprising:
a substrate of plastic film, an undercoating layer having 1000/mm² or more minute granular protrusions of 30 to 500 Å in height provided that the lateral spread is in the range of 1:1 to 20:1, said undercoating layer being formed as a coating on the face of said substrate, a ferromagnetic thin film formed on said undercoating layer, and a lubrication layer formed on said ferromagnetic thin film wherein said granular protrusions comprise nuclei of at least one substance selected from the group consisting of a thermoplastic resin, a cross-linked resin, carbon, an oxide of a metal and the hydrolysis product of a metal alkoxide.

2. A magnetic recording medium in accordance with claim 1, wherein the nuclei are retained on said substrate by a resin binder.

3. A magnetic recording medium in accordance with claim 1, wherein said undercoating layer comprises a scattering of at least one type of minute granule selected from the group consisting of a thermoplastic resin and a cross-linked resin.

4. A magnetic recording medium exhibiting an improved still life while avoiding tape squeal under high temperature and high humidity conditions, said medium comprising a plastic film substrate;

an undercoating layer having at least 1,000 minute granular protrusions substantially uniformly distributed per square millimeter, the granular protrusions ranging from 30 to 500 Å in height provided that the lateral spread is from 1:1 to 20:1, formed on the substrate;

a ferromagnetic thin film formed on the undercoating layer; and a lubrication layer formed on at least those portions of the ferromagnetic film overlying the protrusions wherein said granular protrusions comprise nuclei of at least one substance selected from the group consisting of a thermoplastic resin, a crosslinked resin, carbon, an oxide of a metal and the hydrolysis product of a metal alkoxide.

5. The magnetic recording medium of claim 4 in which there are at least 2,500 minute granular protrusions per square millimeter.

6. The magnetic recording medium of claim 4 in which the ratio of the width to height of the protrusions is in the range of from 2:1 to 10:1.

7. The magnetic recording medium of claim 4 in which the granular protrusions range from 50 to 300 Å in height.

8. The magnetic recording medium of claim 4 in which the substrate is a polyester film.

9. The magnetic recording medium of claim 4 in which the lubrication layer is formed over the entire exposed surface of the ferromagnetic thin film.

10. A magnetic recording medium exhibiting an improved still life while avoiding tape squeal under high temperature and high humidity conditions, said medium comprising a plastic film substrate;

an undercoating layer having at least 1,000 minute granular protrusions substantially uniformly distributed per square millimeter, the granular protrusions ranging from 30 to 500 Å in height provided that the lateral spread is from 1:1 to 20:1, formed on the substrate, the granular protrusions formed by nuclei retained on the substrate by a resin binder;

a ferromagnetic thin film formed on the undercoating layer; and a lubrication layer formed on at least those portions of the ferromagnetic film overlying the protrusions wherein said granular protrusions comprise nuclei of at least one substance selected from the group consisting of a thermoplastic resin, a crosslinked resin, carbon, an oxide of a metal and the hydrolysis product of a metal alkoxide.

11. The magnetic recording medium of claim 10 in which there are at least 2,500 minute granular protrusions per square millimeter.

12. The magnetic recording medium of claim 10 in which the ratio of the width to height of the protrusions is in the range of from 2:1 to 16:1.

13. The magnetic recording medium of claim 10 in which the granular protrusions range from 50 to 300 Å in height.

14. The magnetic recording medium of claim 10 in which the substrate is a polyester film.

15. The magnetic recording medium of claim 10 in which the lubrication layer is formed over the entire exposed surface of the ferromagnetic thin film.

* * * * *